US 6,683,971 B1

(12) United States Patent
Salatino et al.

(10) Patent No.: US 6,683,971 B1
(45) Date of Patent: Jan. 27, 2004

(54) FINGERPRINT SENSOR WITH LEADFRAME BENT PIN CONDUCTIVE PATH AND ASSOCIATED METHODS

(75) Inventors: Mathew M. Salatino, Satellite Beach, FL (US); Charles Hewitt, Melbourne, FL (US); Maurice Rosenfield, Indian Harbor Beach, FL (US); Alvin Hom, Malabar, FL (US)

(73) Assignee: Authentec, Inc., Melbourne, FL (US)

( * ) Notice: Subject to any disclaimer, the term of this patent is extended or adjusted under 35 U.S.C. 154(b) by 0 days.

(21) Appl. No.: 09/567,685

(22) Filed: May 9, 2000

Related U.S. Application Data

(60) Provisional application No. 60/133,628, filed on May 11, 1999.

(51) Int. Cl.[7] .................................................. G06K 9/00
(52) U.S. Cl. ....................................... 382/124; 382/312
(58) Field of Search ................................. 382/115, 116, 382/124, 125, 126, 127, 312; 235/380, 379; 356/71, 451; 713/186, 185; 340/5.83, 5.53

(56) References Cited

U.S. PATENT DOCUMENTS 5,862,248 A * 1/1999 Salatino et al. ............. 382/124
5,940,526 A * 8/1999 Setlak et al. ................ 382/124

* cited by examiner

Primary Examiner—Samir Ahmed
Assistant Examiner—Vikkram Bali
(74) Attorney, Agent, or Firm—Allen, Dyer, Doppelt, Milbrath & Gilchrist, P.A.

(57) ABSTRACT

A fingerprint sensor includes a housing, a fingerprint sensing integrated circuit in the housing, and a leadframe comprising at least one first conductive pin extending upwardly to the upper surface and at least one second conductive pin extending outwardly from the housing. The sensor also includes at least one conductive layer on the upper surface of the housing and this is connected to the at least one first conductive pin. The at least one first conductive pin preferably terminates flush with the upper surface of the housing. In other words, one or more upwardly bent leadframe pins readily establish connection to the respective one or more external electrodes. The integrated circuit may include a finger drive circuit, a wake-up circuit, and/or an ESD circuit and the at least one conductive layer may connected thereto.

32 Claims, 2 Drawing Sheets

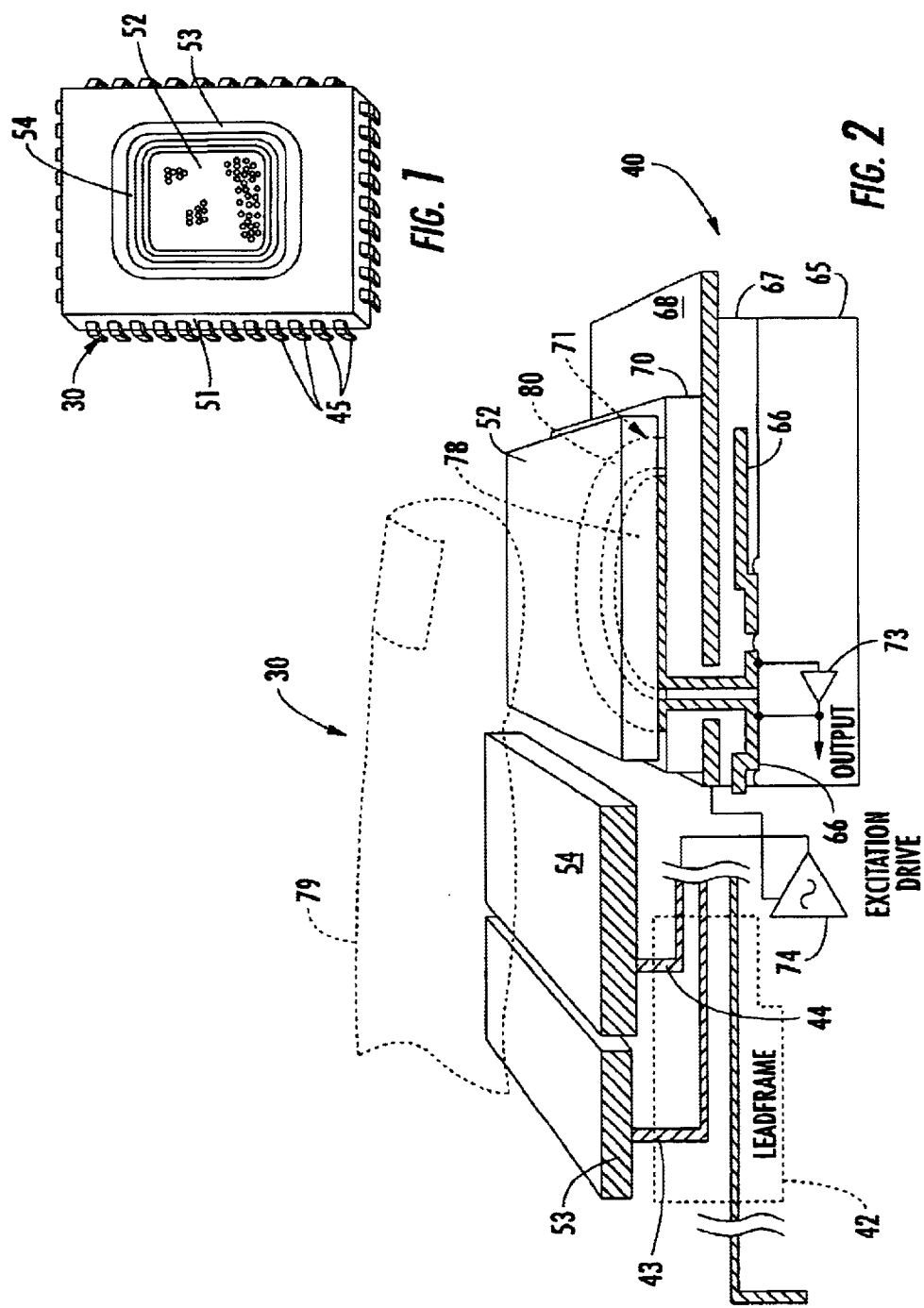

FINGERPRINT SENSOR WITH LEADFRAME BENT PIN CONDUCTIVE PATH AND ASSOCIATED METHODS

RELATED APPLICATION

This application is based upon prior filed provisional application Serial No. 60/133,628 filed May 11, 1999.

FIELD OF THE INVENTION

The present invention relates to the field of personal identification and verification, and, more particularly, to the field of fingerprint sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A typical electronic fingerprint sensor is based upon illuminating the finger surface using visible light, infrared light, or ultrasonic radiation. The reflected energy is captured with some form of camera, for example, and the resulting image is framed, digitized and stored as a static digital image. For example, U.S. Pat. No. 4,210,899 to Swonger et al. discloses an optical scanning fingerprint reader cooperating with a central processing station for a secure access application, such as admitting a person to a location or providing access to a computer terminal. U.S. Pat. No. 4,525,859 to Bowles similarly discloses a video camera for capturing a fingerprint image and uses the minutiae of the fingerprints, that is, the branches and endings of the fingerprint ridges, to determine a match with a database of reference fingerprints.

Unfortunately, optical sensing may be affected by stained fingers or an optical sensor may be deceived by presentation of a photograph or printed image of a fingerprint rather than a true live fingerprint. In addition, optical schemes may require relatively large spacings between the finger contact surface and associated imaging components. Moreover, such sensors typically require precise alignment and complex scanning of optical beams. Accordingly, optical sensors may thus be bulky and be susceptible to shock, vibration and surface contamination. Accordingly, an optical fingerprint sensor may be unreliable in service in addition to being bulky and relatively expensive due to optics and moving parts.

U.S. Pat. No. 4,353,056 to Tsikos discloses another approach to sensing a live fingerprint. In particular, the patent discloses an array of extremely small capacitors located in a plane parallel to the sensing surface of the device. When a finger touches the sensing surface and deforms the surface, a voltage distribution in a series connection of the capacitors may change. The voltages on each of the capacitors is determined by multiplexor techniques. Unfortunately, the resilient materials required for the sensor may suffer from long term reliability problems. In addition, multiplexing techniques for driving and scanning each of the individual capacitors may be relatively slow and cumbersome. Moreover, noise and stray capacitances may adversely affect the plurality of relatively small and closely spaced capacitors.

Significant advances have been made in the area of integrated circuit fingerprint sensors, as disclosed, for example, in U.S. Pat. Nos. 5,828,773 and 5,862,248, both assigned to the assignee of the present invention. The disclosed sensors are based upon generating an electric field which can sense the ridges of a fingerprint despite contamination, skin surface damage, and other factors. The sensor is relatively compact and rugged. The sensing die may be mounted on a leadframe so that the conductive pins extend outwardly from side edges of the package for connection to a circuit board.

As disclosed in U.S. Pat. No. 5,862,248 to Salatino et al., an electrically conductive ring may be formed surrounding an opening in the encapsulating package. The integrated circuit die is exposed through the opening. The conductive ring may be used to drive the finger of the user to produce the fingerprint image from a plurality of sensing electrodes on the surface of the integrated circuit. Electrical contact between the conductive ring and the integrated circuit may be established by positioning the ring on an insulating layer on the die and forming one or more conductor filled vias through the insulating layer.

U.S. Pat. No. 5,940,526 to Setlak et al. discloses additional advances in the area of electric field fingerprint sensors. In particular, two electrically conductive rings are provided on the exterior upper surface of the housing. One ring may be used to discharge accumulated electrical charge from the finger of the user. The other electrode can be used to sense finger contact to thereby wake-up the device and supply power thereto. Connections from the integrated circuit die to the external rings may be made by conductor filled vias extending through the housing.

Unfortunately, manufacturing may be somewhat awkward to establish the connection to the external electrodes carrier by the housing for contact with the finger of the user. Conductor filled vias through the housing may be difficult to accurately form and ensure reliable contact.

SUMMARY OF THE INVENTION

In view of the foregoing background, it is therefore an object of the present invention to provide a fingerprint sensor and related methods to facilitate ease of manufacture and ensure reliable connection to the one or more external electrodes carried by the housing of the sensor.

This and other objects, features and advantages in accordance with the present invention are provided by a fingerprint sensor comprising a housing, a fingerprint sensing integrated circuit in the housing, and a leadframe comprising at least one first conductive pin extending upwardly to the upper surface and at least one second conductive pin extending outwardly from the housing. The sensor also includes at least one conductive layer on the upper surface of the housing and this is connected to the at least one first conductive pin. The at least one first conductive pin preferably terminates flush with the upper surface of the housing. In other words, one or more upwardly bent leadframe pins readily establish connection to the respective one or more external electrodes.

The integrated circuit may include a finger drive circuit and the at least one conductive layer is connected to the finger drive circuit by the at least one first conductive pin. The circuit may include an electrostatic discharge circuit, and the at least one first conductive pin connects to the electrostatic discharge circuit. The integrated circuit may also include a wake-up circuit and wherein the at least one conductive layer is connected to this wake-up circuit by the at least one first conductive pin.

The housing preferably has an opening therein aligned with the integrated circuit for permitting finger contact with the sensing portion of the integrated circuit. The integrated circuit may include a plurality of electric field sensing electrodes. In addition, a respective shield electrode may surround each of the electric field sensing electrodes. The leadframe preferably comprises metal, and the housing may preferably be provided by an integrally molded body of encapsulating material.

A method aspect of the invention is for making an integrated circuit package of a type including a leadframe, an integrated circuit connected to the leadframe, a housing surrounding the leadframe and the integrated circuit, and at least one electrically conductive layer on a predetermined surface of the housing. The leadframe preferably comprises a plurality of conductive pins. The method preferably comprises: forming at least one first conductive pin of the leadframe to extend to a predetermined surface of the housing; forming at least one second conductive pin of the leadframe to extend outwardly from the housing; and forming at least one conductive layer on the predetermined surface of the housing and connected to the at least one first conductive pin.

Of course, the integrated circuit may preferably comprise a fingerprint sensing integrated circuit. In addition, the predetermined surface may be an upper surface which has an opening therein to permit finger contact with the fingerprint sensing integrated circuit.

BRIEF DESCRIPTION OF THE DRAWINGS

FIG. 1 is a top plan view of a fingerprint sensor in accordance with the present invention.

FIG. 2 is a schematic view of a circuit portion of the fingerprint sensor as shown in FIG. 1.

DETAILED DESCRIPTION OF THE PREFERRED EMBODIMENTS

Figure 3:
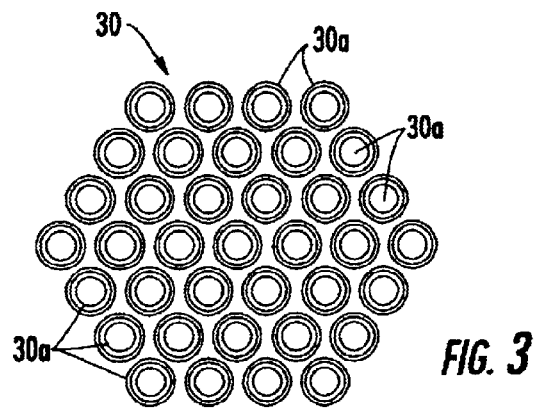
FIG. 3 is a greatly enlarged top plan view of the sensing portion of the fingerprint sensor as shown in FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The scaling of various features particularly layers in the drawing figures, have been exaggerated for clarity of explanation.

Referring initially to FIGS. 1–3, the fingerprint sensor 30 in accordance with the invention is now described. The illustrated sensor 30 includes a housing 51, a dielectric layer 52 exposed on an upper surface and which provides a placement surface for the finger, and a plurality of output pins 45. A first conductive strip or external electrode 54 around the periphery of the dielectric layer 52, and a second external electrode 53 provide external contact electrodes for the finger 79 as described in greater detail below. The sensor 30 may provide output signals in a range of sophistication levels depending on the level of processing incorporated in the package as would be readily understood by those skilled in the art.

The sensor 30 includes a plurality of individual pixels or sensing elements 30a arranged in array pattern as perhaps best shown in FIG. 3. As would be readily understood by those skilled in the art, these sensing elements are relatively small so as to be capable of sensing the ridges and intervening valleys of a typical fingerprint. As will also be readily appreciated by those skilled in the art, live fingerprint readings as from the electric field sensor 30 in accordance with the present invention may be more reliable than optical sensing, because the impedance of the skin of a finger in a pattern of ridges and valleys is extremely difficult to simulate. In contrast, an optical sensor may be deceived by a photocopy, photograph or other similar image of a fingerprint, for example.

The sensor 30 includes a substrate 65, and one or more active semiconductor devices formed thereon, such as the schematically illustrated amplifier 73. A first metal layer 66 interconnects the active semiconductor devices. A second or ground plane metal layer 68 is above the first metal layer 66 and separated therefrom by an insulating layer 67. A third metal layer 71 is positioned over another dielectric layer 70. In the illustrated embodiment, the first external electrode 54 is connected to an excitation drive amplifier 74 which, in turn, drives the finger 79 with a signal that may typically be in the range of about 1 KHz to 1 MHZ. Accordingly, the drive or excitation electronics are thus relatively uncomplicated and the overall cost of the sensor 30 may be relatively low, while the reliability is great.

An illustratively circularly shaped electric field sensing electrode 78 is on the insulating layer 70. The sensing electrode 78 may be connected to sensing integrated electronics, such as the illustrated amplifier 73 formed adjacent the substrate 65 as schematically illustrated, and as would be readily appreciated by those skilled in the art.

An annularly shaped shield electrode 80 surrounds the sensing electrode 78 in spaced relation therefrom. As would be readily appreciated by those skilled in the art, the sensing electrode 78 and its surrounding shield electrode 80 may have other shapes, such as hexagonal, for example, to facilitate a close packed arrangement or array of pixels or sensing elements 30a. The shield electrode 80 is an active shield which is driven by a portion of the output of the amplifier 73 to help focus the electric field energy and, moreover, to thereby reduce the need to drive adjacent electric field sensing electrodes 78.

The illustrated sensor 30 includes only three metal or electrically conductive layers 66, 68 and 71. The sensor 30 can be made without requiring additional metal layers which would otherwise increase the manufacturing cost, and, perhaps, reduce yields. Accordingly, the sensor 30 is less expensive and may be more rugged and reliable than a sensor including four or more metal layers as would be appreciated by those skilled in the art.

In general, the sensing elements 30a operate at very low currents and at very high impedances. For example, the output signal from each sensing electrode 78 is desirably about 5 to 10 millivolts to reduce the effects of noise and permit further processing of the signals. The approximate diameter of each sensing element 30a, as defined by the outer dimensions of the shield electrode 80, may be about 0.002 to 0.005 inches in diameter. The ground plane metal layer 68 protects the active electronic devices from unwanted excitation. The various signal feedthrough conductors for the electrodes 78, 80 to the active electronic circuitry may be readily formed as would be understood by those skilled in the art.

The overall contact or sensing surface for the sensor 30 may desirably be about 0.5 by 0.5 inches—a size which may be readily manufactured and still provide a sufficiently large surface for accurate fingerprint sensing and identification. The sensor 30 in accordance with the invention is also fairly tolerant of dead pixels or sensing elements 30a. A typical sensor 30 includes an array of about 256 by 256 pixels or sensor elements, although other array sizes are also contemplated by the present invention. The sensor 30 may also be fabricated at one time using primarily conventional semiconductor manufacturing techniques to thereby significantly reduce the manufacturing costs.

Operation of the fingerprint sensor and, in particular, the image processing circuitry thereof, is further described in U.S. Pat. Nos. 5,828,773; 5,862,248; and 5,940,526 assigned to the assignee of the present invention. The subject matter of each of these patents is incorporated herein by reference in its entirety.

Figure 4:
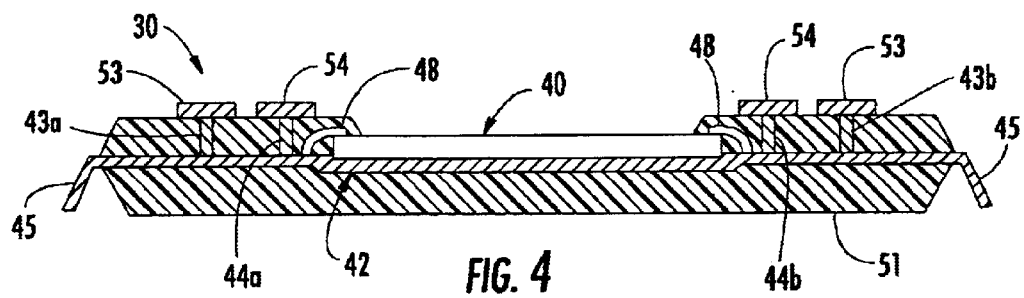
FIG. 4 is a cross-sectional view of the fingerprint sensor as shown in FIG. 1.
Figure 5:
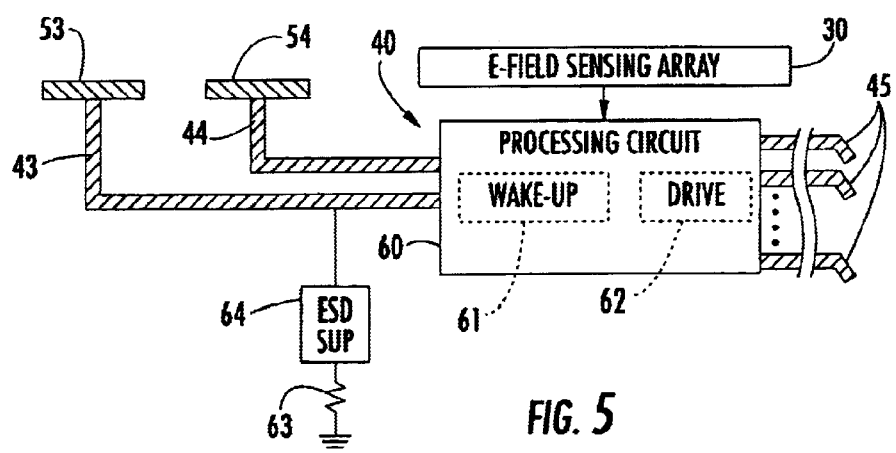
FIG. 5 is a block diagram of portions of the fingerprint sensor as shown in FIG. 1 and illustrating a pair of external electrodes connected to the processing circuit by upwardly bent leadframe pins.

Referring now additionally to FIGS. 4 and 5, a significant packaging advance in accordance with the invention is now described. In the past, a fingerprint sensing integrated circuit or die has been connected to a leadframe which includes a plurality of external connecting pins. Unfortunately, it has been difficult to connect to the one or more external electrodes typically used in such a sensor. As shown perhaps best in FIGS. 2, 4 and 5, the present invention overcomes this limitation of the prior art sensors, by forming at least one first conductive pin 43, 44 of the metal leadframe 42 to extend upwardly to the upper surface of the encapsulating plastic housing 51. In FIG. 4, a pair of pins 43a, 43b connect to the second external electrode 53, and a pair of pins 44a, 44b connect to the first electrode 54. The external electrodes 53, 54 may be formed by any of a number of techniques, such as printing of a conductive layer as will be readily appreciated by those skilled in the art.

Of course, more than two such pins could also be connected as will be appreciated by those skilled in the art. In addition, only one external electrode, or multiple such electrodes can be connected using the upwardly bent leadframe pin in accordance with the present invention.

The at least one second conductive pin 45 extends outwardly in a conventional fashion from the housing 51. The upwardly bent conductive pins 43, 44 preferably terminate flush with the upper surface of the housing 51. Accordingly, electrical connection is readily established with the conductive layers printed thereover to define the external electrodes 53, 54. The pins to be upwardly bent, can be initially formed to have a predetermined length so that they will terminate at the upper surface of the housing 51. If the pins are slightly longer, they will bend when positioned in the mold so that they terminate flush with the upper surface as will be readily appreciated by those skilled in the art. In addition, as shown in FIG. 4, bond wires 48 are connected in a conventional fashion to the pins 43, 44 and 45 as will be readily appreciated by those skilled in the art.

Referring now more particularly to FIG. 5, the integrated circuit 40 may include processing circuitry 60 connected to the array of electric field sensing electrodes 30 for generating and processing a fingerprint image. The processing circuit 60 also illustratively includes a drive circuit 62 and a wake-up circuit 61. The wake-up circuit 61 delays powering of various active portions of the processing circuit 60 until any accumulated electrical charge is discharged through the illustrated ESD suppressor 64 and resistor 63 as will be appreciated by those skilled in the art. After ESD has been discharged, the drive circuit 62 may be connected to one or both of the external electrodes 53, 54 to thereby produce the fingerprint image.

A method aspect of the invention is for making an integrated circuit package as described above. More particularly, the package may be a fingerprint sensor 30 of a type including a leadframe 42, an integrated circuit 40 connected to the leadframe, a housing 51 surrounding the leadframe and the integrated circuit, and at least one electrically conductive layer 53, 54 on a predetermined surface of the housing. The leadframe preferably comprises a plurality of conductive pins 43–45. The method preferably comprises: forming at least one first conductive pin 43, 44 of the leadframe 42 to extend to a predetermined surface of the housing 51; forming at least one second conductive pin 45 of the leadframe to extend outwardly from the housing; and forming at least one conductive layer 53, 54 on the predetermined surface of the housing and connected to the at least one first conductive pin 43, 44.

Of course, the integrated circuit 30 may preferably comprise a fingerprint sensing integrated circuit 40 as described extensively herein. In addition, the predetermined surface may be an upper surface which has an opening therein to permit finger contact with the fingerprint sensing integrated circuit 40. The concepts and features of the present invention may have application for other semiconductor devices as will be appreciated by those skilled in the art. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fingerprint sensor comprising:
   a housing having an opening on an upper surface thereof;
   a fingerprint sensing integrated circuit in said housing and aligned with the opening therein to permit contact by a finger on said fingerprint sensing integrated circuit;
   a leadframe comprising at least one first conductive pin extending to the upper surface of said housing and at least one second conductive pin extending outwardly from said housing; and
   at least one conductive layer on the upper surface of said housing and connected to said at least one first conductive pin.

2. A fingerprint sensor according to claim 1 wherein said at least one first conductive pin terminates flush with the upper surface of said housing.

3. A fingerprint sensor according to claim 1 wherein said at least one second conductive pin extends outwardly from side edges of said housing.

4. A fingerprint sensor according to claim 1 wherein said fingerprint sensing integrated circuit comprises a finger drive circuit and wherein said at least one conductive layer is connected to said finger drive circuit by said at least one first conductive pin.

5. A fingerprint sensor according to claim 1 wherein said fingerprint sensing integrated circuit further comprises an electrostatic discharge circuit; and wherein said at least one conductive layer is connected to said electrostatic discharge circuit by said at least one first conductive pin.

6. A fingerprint sensor according to claim 1 wherein said fingerprint sensing integrated circuit further comprises a wake-up circuit and wherein said at least one conductive layer is connected to said wake-up circuit by said at least one first conductive pin.

7. A fingerprint sensor according to claim 1 wherein said at least one electrically conductive layer is positioned adjacent the opening in said housing for permitting finger contact therewith when the finger of the user is positioned on said fingerprint sensing integrated circuit.

8. A fingerprint sensor according to claim 1 wherein said fingerprint sensing integrated circuit comprises a plurality of electric field sensing electrodes.

9. A fingerprint sensor according to claim 8 wherein said fingerprint sensing integrated circuit further comprises a respective shield electrode surrounding each of said electric field sensing electrodes.

10. A fingerprint sensor according to claim 1 wherein said leadframe comprises metal.

11. A fingerprint sensor according to claim 1 wherein said housing comprises plastic.

12. A fingerprint sensor according to claim 1 wherein said housing comprises a body of encapsulating material.

13. A fingerprint sensor comprising:
a housing having an opening on an upper surface thereof;
a fingerprint sensing integrated circuit in said housing and aligned with the opening therein to permit contact by a finger on said fingerprint sensing integrated circuit;
a leadframe comprising at least one first conductive pin extending to and terminating flush with the upper surface of said housing and at least one second conductive pin extending outwardly from said housing; and
at least one conductive layer on the upper surface of said housing adjacent the opening and connected to said at least one first conductive pin.

14. A fingerprint sensor according to claim 13 wherein said at least one second conductive pin extends outwardly from side edges of said housing.

15. A fingerprint sensor according to claim 13 wherein said fingerprint sensing integrated circuit comprises a finger drive circuit and wherein said at least one conductive layer is connected to said finger drive circuit by said at least one first conductive pin.

16. A fingerprint sensor according to claim 13 wherein said fingerprint sensing integrated circuit further comprises an electrostatic discharge circuit; and wherein said at least one conductive layer is connected to said electrostatic discharge circuit by said at least one first conductive pin.

17. A fingerprint sensor according to of claim 13 wherein said fingerprint sensing integrated circuit further comprises a wake-up circuit and wherein said at least one conductive layer is connected to said wake-up circuit by said at least one first conductive pin.

18. A fingerprint sensor according to claim 13 wherein said fingerprint sensing integrated circuit comprises a plurality of electric field sensing electrodes.

19. A fingerprint sensor according to claim 18 wherein said fingerprint sensing integrated circuit further comprises a respective shield electrode surrounding each of said electric field sensing electrodes.

20. A fingerprint sensor according to claim 13 wherein said leadframe comprises metal; and wherein said housing comprises a body of encapsulating material.

21. An integrated circuit package comprising:
a housing having a predetermined surface;
an integrated circuit in said housing;
a leadframe comprising at least one first conductive pin extending to the predetermined surface of said housing and at least one second conductive pin extending outwardly from said housing; and
at least one conductive layer on the predetermined surface of said housing and connected to said at least one first conductive pin.

22. An integrated circuit package according to claim 21 wherein said integrated circuit comprises a fingerprint sensing integrated circuit.

23. An integrated circuit package according to claim 22 wherein the predetermined surface has an opening therein to permit finger contact with the fingerprint sensing integrated circuit.

24. An integrated circuit package according to claim 21 wherein said at least one first conductive pin terminates flush with the predetermined surface of said housing.

25. An integrated circuit package according to claim 21 wherein said at least one second conductive pin extends outwardly from side edges of said housing.

26. An integrated circuit package according to claim 21 wherein said integrated circuit further comprises an electrostatic discharge circuit; and wherein said at least one conductive layer is connected to said electrostatic discharge circuit by said at least one first conductive pin.

27. An integrated circuit package according to claim 21 wherein said integrated circuit further comprises a wake-up circuit and wherein said at least one conductive layer is connected to said wake-up circuit by said at least one first conductive pin.

28. An integrated circuit package according to claim 21 wherein said leadframe comprises metal; and wherein said housing comprises a body of encapsulating material.

29. A method for making an integrated circuit package of a type including a leadframe, an integrated circuit connected to said leadframe, a housing surrounding the leadframe and the integrated circuit, and at least one electrically conductive layer on a predetermined surface of the housing, and wherein the leadframe comprises a plurality of conductive pins, the method comprising:
forming at least one first conductive pin of the leadframe to extend to a predetermined surface of said housing;
forming at least one second conductive pin of the leadframe to extend outwardly from said housing; and
forming at least one conductive layer on the predetermined surface of the housing and connected to the at least one first conductive pin.

30. A method according to claim 29 wherein the integrated circuit comprises a fingerprint sensing integrated circuit; and wherein the predetermined surface has an opening therein to permit finger contact with the fingerprint sensing integrated circuit.

31. A method according to claim 29 wherein the step of forming the at least one first conductive pin comprises forming the at least one first conductive pin to terminate flush with the predetermined surface of the housing.

32. A method according to claim 29 wherein the leadframe comprises metal; and wherein the housing comprises a body of encapsulating material.

* * * * *